US008243354B2

(12) United States Patent
Fujisaku

(10) Patent No.: US 8,243,354 B2
(45) Date of Patent: Aug. 14, 2012

(54) CONTROL APPARATUS AND METHOD OF EXTERNAL MODULATOR

(75) Inventor: Yoshiharu Fujisaku, Tokyo (JP)

(73) Assignee: Fujikura Ltd., Tokyo (JP)

( * ) Notice: Subject to any disclaimer, the term of this patent is extended or adjusted under 35 U.S.C. 154(b) by 274 days.

(21) Appl. No.: 12/686,785

(22) Filed: Jan. 13, 2010

(65) Prior Publication Data

US 2010/0142025 A1    Jun. 10, 2010

(30) Foreign Application Priority Data

Dec. 4, 2007    (JP) ................................. 2007-313474

(51) Int. Cl.
*G02B 26/00* (2006.01)
*G02F 1/01* (2006.01)

(52) U.S. Cl. ...................................... 359/239; 359/238

(58) Field of Classification Search .................. 332/103; 341/143; 359/238, 239; 372/26; 375/E1.002
See application file for complete search history.

(56) References Cited

U.S. PATENT DOCUMENTS

| 7,012,938 | B2 * | 3/2006 | Hamajima et al. | ............... 372/26 |
| 2004/0190103 | A1 | 9/2004 | Fujita et al. | |

FOREIGN PATENT DOCUMENTS

| JP | 3-251815 A | 11/1991 |
| JP | 08-136871 A | 5/1996 |
| JP | 08-254672 A | 10/1996 |

(Continued)

OTHER PUBLICATIONS

International Search Report of PCT/JP2008/072084, mailing date of Jan. 6, 2009.

Japanese Office Action dated Nov. 9, 2010, issued in corresponding Japanese Patent Application No. 2006-053227.

(Continued)

*Primary Examiner* — Ricky Mack
*Assistant Examiner* — Mahidere Sahle
(74) *Attorney, Agent, or Firm* — Westerman, Hattori, Daniels & Adrian, LLP

(57) ABSTRACT

A control apparatus for an external modulator that modulates light emitted from a light source based on an input signal, the control apparatus comprises: a low-frequency signal generating device that generates and outputs a low-frequency signal having a predetermined frequency; a signal superimposing device that superimposes a first modulation signal, which is the input signal on the low-frequency signal, to make a second modulation signal, and applies this second modulation signal to the external modulator; a low-frequency signal detecting device that detects the low-frequency signal component from an optical output of the external modulator, compares a phase of this detected low-frequency signal with a phase of a low-frequency signal output from the low-frequency signal generating device, and outputs a signal according to a phase difference; an operating point control device that controls based on an output signal of the low-frequency signal detecting device, so as to compensate for operating point drift of the external modulator; an optical power level detecting device that detects an average value of an optical output of the external modulator; and a variable gain amplifying device configured so as to set a gain based on a detection output of the optical power level detecting device, that amplifies an output of the low-frequency signal detecting device, and outputs this to the operating point control device, wherein gain of the variable gain amplifying device is set so that a closed-loop gain of a loop from an output side of the external modulator through the operating point control device and back to the external modulator, becomes constant.

4 Claims, 10 Drawing Sheets

FOREIGN PATENT DOCUMENTS

| | | | |
|---|---|---|---|
| JP | 2004-077513 A | | 3/2004 |
| JP | 2004077513 A | * | 3/2004 |
| JP | 2004-118060 A | | 4/2004 |
| JP | 2004-294827 A | | 10/2004 |
| JP | 2004294827 A | * | 10/2004 |
| JP | 2005-309468 A | | 11/2005 |
| JP | 2006-314003 A | | 11/2006 |

OTHER PUBLICATIONS

Japanese Office Action dated Nov. 9, 2010, issued in corresponding Japanese Patent Application No. 2009-522850.

Japanese Office Action dated Jan. 25, 2011, issued in corresponding Japanese Patent Application No. 2009-522850.

* cited by examiner

CONTROL APPARATUS AND METHOD OF EXTERNAL MODULATOR

TECHNICAL FIELD

The present invention relates to a control apparatus and method of a Mach-Zehnder type optical modulator to be used in an optical communication system.

Priority is claimed on Japanese Patent Application No. 2007-313474, filed Dec. 4, 2007, the contents of which are incorporated herein by reference.

BACKGROUND ART

As an external modulator, Mach-Zehnder (MZ) type modulators such as $LiNbO_3$ modulators (LN modulator) are known in which the optical transparency characteristic changes to a sinusoidal waveform (cycle $2V\pi$) with respect to applied voltage. However, this transparency characteristic is sensitive to disturbances such as temperature changes, and hence temporal changes (operating point drift) occur therein.

Here, "operating point drift" refers to a drift in a direction in which applied voltage increases or decreases, in the characteristic curve representing a relationship between applied voltage and optical output power.

Among various methods for compensating for operating point drift of an external modulator such as a Mach-Zehnder (MZ) type modulator, a low-frequency superimposing method has been widely used because of its simplicity and convenience. This low-frequency superimposing method is a method in which a low-frequency signal is preliminarily superimposed on a modulation signal, and the amount of an operating point shift is compensated for according to a phase difference between the low-frequency signal component detected in the output of the external modulator, and the original low-frequency signal. FIG. 10 shows a configuration of a conventional control apparatus 21 for an external modulator that uses of the low-frequency superimposing method (Patent Document 1).

In FIG. 10, the conventional control apparatus for an external modulator to be used in optical communication is provided with a light source 20, a Mach-Zehnder (MZ) type optical modulator 22, an optical branching unit 23, a low-frequency oscillator 24, a low-frequency superimposing unit 25, a low-frequency signal detecting unit 26, and an operating point control unit 27.

The optical branching unit 23 branches and outputs the optical output from the Mach-Zehnder (MZ) type optical modulator 22 to an optical output unit (not shown in the figure) side and to the low-frequency signal detecting unit 26 side.

The low-frequency oscillator 24 generates and outputs low-frequency signals (frequency f) for detecting the amount of operating point shift of the Mach-Zehnder type optical modulator 22.

The low-frequency superimposing unit 25 superimposes a modulation signal for modulating light output from the light source 20, and a low-frequency signal (frequency output from the low-frequency oscillator 24.

The low-frequency signal detecting unit 26 detects, among the optical outputs of the Mach-Zehnder (MZ) type optical modulator 22, the low-frequency signal component (frequency f) that has been superimposed on the modulation signal by the low-frequency superimposing unit 25. Moreover, it outputs a direct current voltage signal according to the phase difference (the amount of the operating point shift of the Mach-Zehnder type optical modulator 22) between this low-frequency signal component (frequency f) and the low-frequency signal (frequency f) output from the low-frequency oscillator.

The operating point control unit 27 controls the operating point based on the electrical signal output from the low-frequency signal detecting unit 26, so as to compensate for the amount of operating point shift (operating point drift) of the Mach-Zehnder (MZ) type optical modulator 22.

In the above configuration, the continuous light output from the light source 20 is input to the Mach-Zehnder type optical modulator 22, and optical modulation is performed. The electrical signal used in this optical modulation is a signal in which the low-frequency signal (frequency f) output from the low-frequency oscillator 24 has been superimposed on the modulation signal by the low-frequency superimposing unit 25. Therefore, the optical modulation signal contains the low-frequency signal (frequency f) component.

In the Mach-Zehnder type optical modulator 22, the continuous light output from the light source 20 is modulated by means of the modulation signal containing the low-frequency signal component output from the low-frequency superimposing unit 25, and is then output to the optical branching unit 23.

The modulation output of the Mach-Zehnder type optical modulator 22 is branched and output by the optical branching unit 23, to the optical output unit side and the low-frequency signal detecting unit 26 side.

The low-frequency signal detecting unit 26 detects the low-frequency signal component (frequency f), compares the phase of the detected low-frequency signal with the phase of the low-frequency signal (frequency f) output from the low-frequency oscillator 24, and outputs, to the operating point control unit 27, phase difference information, that is, a signal that signifies the amount of operating point shift of the Mach-Zehnder type optical modulator 22 (direct current voltage signal).

In this low-frequency detecting unit 26, the optical output that has been taken out at the optical branching unit 23 is converted by a photodiode into an electrical signal to be detected. This electrical signal contains the low-frequency signal that has been superimposed in the low-frequency superimposing unit. After being appropriately amplified in an amplifier, this detected electrical signal is mixed by a mixer with the low-frequency input from the low-frequency oscillator to the mixer, and the phase is detected. In the output from the mixer corresponding to this phase, signals above a predetermined frequency are cut off by a low-pass filter, and a direct current voltage signal is output to the operating point control unit 27.

In the operating point control unit 27, a control voltage for compensating for the operating point drift (operating point shift amount) of the Mach-Zehnder type optical modulator 22 based on the phase difference information, is applied to the Mach-Zehnder type optical modulator 22. That is to say, a bias voltage is shifted according to the electrical signal output from the low-frequency signal detecting unit 26, and the operating point drift of the Mach-Zehnder (MZ) type optical modulator 12 is compensated.

By means of a feedback control operation with a feedback loop of the above optical branching unit 23, the low-frequency signal detecting unit 26, and the operating point control unit 27, it is possible to compensate for the operating point drift of the Mach-Zehnder type optical modulator 22 and to stably perform modulation, following the operating point drift.

[Patent Document 1] Japanese Unexamined Patent Application, First Publication No. H03-251815

DISCLOSURE OF INVENTION

Problems to be Solved by the Invention

However, in the control apparatus for an external modulator disclosed in Patent Document 1, all that is illustrated is that operating point control of the Mach-Zehnder type optical modulator is performed by a feedback control method using a feedback loop of the optical branching unit 23, the low-frequency signal detecting unit 26, and the operating point control unit 27, as described above. There is no disclosure of influence on changes in the optical input power of the Mach-Zehnder type optical modulator.

In the light source 20, changes in the optical output power may occur due to temperature changes, temporal changes, and the like. Moreover, there may be a requirement for a system that changes the optical output power of the light source 20 in order to change the optical output power of the Mach-Zehnder type optical modulator 22.

If the optical input power to the Mach-Zehnder type optical modulator 22 changes, then closed-loop gain, that is, gain of the feedback loop of the Mach-Zehnder type optical modulator 22→the optical branching unit 23→the low-frequency signal detecting unit 26→the operating point control unit 27, will change. FIG. 11 is a graph showing an aspect when the closed-loop gain changes. The vertical axis of the graph represents the magnitude of the direct current voltage signal output from the low-frequency signal detecting unit 26, and the horizontal axis represents the cross-point of the optical signal output from the Mach-Zehnder type optical modulator 22. Moreover, the solid line S1 in the graph shows a relationship between the optical signal cross-point and the direct current voltage signal, before the closed-loop gain changes. The dotted line S2 in the graph shows a relationship between the optical signal cross-point and the direct current voltage signal, after the closed-loop gain has changed. As shown in FIG. 11, when the closed-loop gain changes, the slope of the straight line changes, and consequently the optical signal cross-point changes.

The present invention takes into consideration the above circumstances, with an object of providing a control apparatus and method of an external modulator that reduces dependency of the operating point on changes in the optical input power to the external modulator.

Means for Solving the Problem

The present invention employs the followings in order to solve the above problems and achieve the object.
(1) A control apparatus for an external modulator of the present invention is a control apparatus for an external modulator that modulates light emitted from a light source based on an input signal, the control apparatus including: a low-frequency signal generating device that generates and outputs a low-frequency signal having a predetermined frequency; a signal superimposing device that superimposes a first modulation signal, which is the input signal, and the low-frequency signal, to make a second modulation signal, and applies this second modulation signal to the external modulator; a low-frequency signal detecting device that detects the low-frequency signal component from an optical output of the external modulator, compares a phase of this detected low-frequency signal with a phase of a low-frequency signal output from the low-frequency signal generating device, and outputs a signal according to a phase difference; an operating point control device that controls based on an output signal of the low-frequency signal detecting device, so as to compensate for an operating point drift of the external modulator; an optical power level detecting device that detects an average value of an optical output of the external modulator; and a variable gain amplifying device configured so as to set a gain based on a detection output of the optical power level detecting device, that amplifies an output of the low-frequency signal detecting device, and outputs this to the operating point control device, wherein gain of the variable gain amplifying device is set so that a closed-loop gain of a loop from an output side of the external modulator through the operating point control device and back to the external modulator, becomes constant.

According to the control apparatus for an external modulator described in (1) above, the gain of the variable gain amplifying device is set so that the closed-loop gain in the loop from the output side of the external modulator through the operating point control device and back to the external modulator, becomes constant.

Thereby, changes in the operating point of the external modulator can be suppressed, while reducing dependency of the operating point on changes in the input power of the external modulator.

(2) A control apparatus for an external modulator of the present invention is a control apparatus for an external modulator that modulates light emitted from a light source based on an input signal, the control apparatus including: a low-frequency signal generating device that generates and outputs a low-frequency signal having a predetermined frequency; a signal superimposing device that superimposes a first modulation signal, which is the input signal, and the low-frequency signal, to make a second modulation signal, and applies this second modulation signal to the external modulator; a low-frequency signal detecting device that detects the low-frequency signal component from an optical output of the external modulator, compares a phase of this detected low-frequency signal with a phase of a low-frequency signal output from the low-frequency signal generating device, and outputs a signal according to a phase difference; an operating point control device that controls based on an output signal of the low-frequency signal detecting device, so as to compensate for an operating point drift of the external modulator; an optical power level detecting device that detects an average value of an optical output of the external modulator; and an optical output control device that controls an optical output of the light source based on a detection output of the optical power level detecting device so that a detection value of the optical power level detecting device becomes constant.

According to the control apparatus for an external modulator described in (2) above, the output of the external modulator can be maintained constant, and the closed-loop gain in a loop from the output side of the external modulator through the operating point control device and back to the external modulator, becomes constant. Consequently, changes in the operating point of the external modulator can be suppressed, while reducing dependency of the operating point on changes in the input power of the external modulator.

(3) A control method of an external modulator of the present invention is a control method of an external modulator that modulates light emitted from a light source based on an input signal, the control method including: a first step for generating a low-frequency signal having a predetermined frequency by means of a low-frequency signal generating device; a second step for superimposing by means of a signal superimposing device, the low-frequency signal generated in the first step on a first modulation signal, which is the input signal, to make a second modulation signal, and applying this second modulation signal to the external modulator; a third step for detecting an average value of an optical output of the external modulator by means of an optical power level detecting device; a fourth step for detecting by means of a low-frequency signal detecting device, the low-frequency signal component from an optical output of the external modulator, comparing a phase of this detected low-frequency signal with a phase of a low-frequency signal output from the low-frequency signal generating device, and outputting a signal according to a phase difference; a fifth step for setting a gain of a variable gain amplifying device that amplifies an output of the low-frequency signal detecting device and outputs this to the operating point control device, based on a detection output of the optical power level detecting device; and a sixth step for controlling, by means of an operating point control device, based on a signal according to the phase difference, so as to compensate for operating point drift of the external modulator, wherein in the fifth step, gain of the variable gain amplifying device is set based on a signal output in the third step, so that a closed-loop gain of a loop from an optical output side of the external modulator through the operating point control device and back to the external modulator, becomes constant.

According to the control method of an external modulator described in (3) above, the gain of the variable gain amplifying device is set so that the closed-loop gain in the loop from the optical output side of the external modulator through the operating point control device and back to the external modulator, becomes constant.

Thus, the closed-loop gain in the loop from the output side of the external modulator through the operating point control device and back to the external modulator, becomes constant. Therefore changes in the operating point of the external modulator can be suppressed, while reducing dependency of the operating point on changes in the input power of the external modulator.

(4) A control method of an external modulator of the present invention is a control method of an external modulator that modulates light emitted from a light source based on an input signal, the control method including: a first step for generating a low-frequency signal having a predetermined frequency by means of a low-frequency signal generating device; a second step for superimposing by means of a signal superimposing device, the low-frequency signal on a first modulation signal, which is the input signal, to make a second modulation signal, and applying this second modulation signal to the external modulator; a third step for detecting an average value of an optical output of the external modulator by means of an optical power level detecting device; a fourth step for detecting by means of a low-frequency signal detecting device, the low-frequency signal component from an optical output of the external modulator, comparing a phase of this detected low-frequency signal with a phase of a low-frequency signal output from the low-frequency signal generating device, and outputting a signal according to a phase difference; a fifth step for controlling by means of an operating point control device, based on a signal according to the phase difference, so as to compensate for operating point drift of the external modulator; and a sixth step for controlling an optical output of the light source by means of an optical output control device, based on a detection output of the third step, so that a detected value of the optical power level detecting device becomes constant.

According to the control method of an external modulator described in (4) above, the output of the external modulator can be maintained constant, and the closed-loop gain in a loop from the output side of the external modulator through the operating point control device and back to the external modulator, becomes constant. Therefore changes in the operating point of the external modulator can be suppressed, while reducing dependency of the operating point on changes in the input power of the external modulator.

Effect of the Invention

According to the control apparatus for an external modulator described in (1) above, it is possible to control the gain of the variable gain amplifying device that amplifies a signal to be output to the operating point control device, or to control the output of the external modulator, so that the closed-loop gain in the loop from the output side of the external modulator through the operating point control device and back to the external modulator, becomes constant. Therefore changes in the operating point of the external modulator can be suppressed, while reducing dependency of the operating point on changes in the input power of the external modulator.

DESCRIPTION OF THE REFERENCE SYMBOLS

Figure 1:
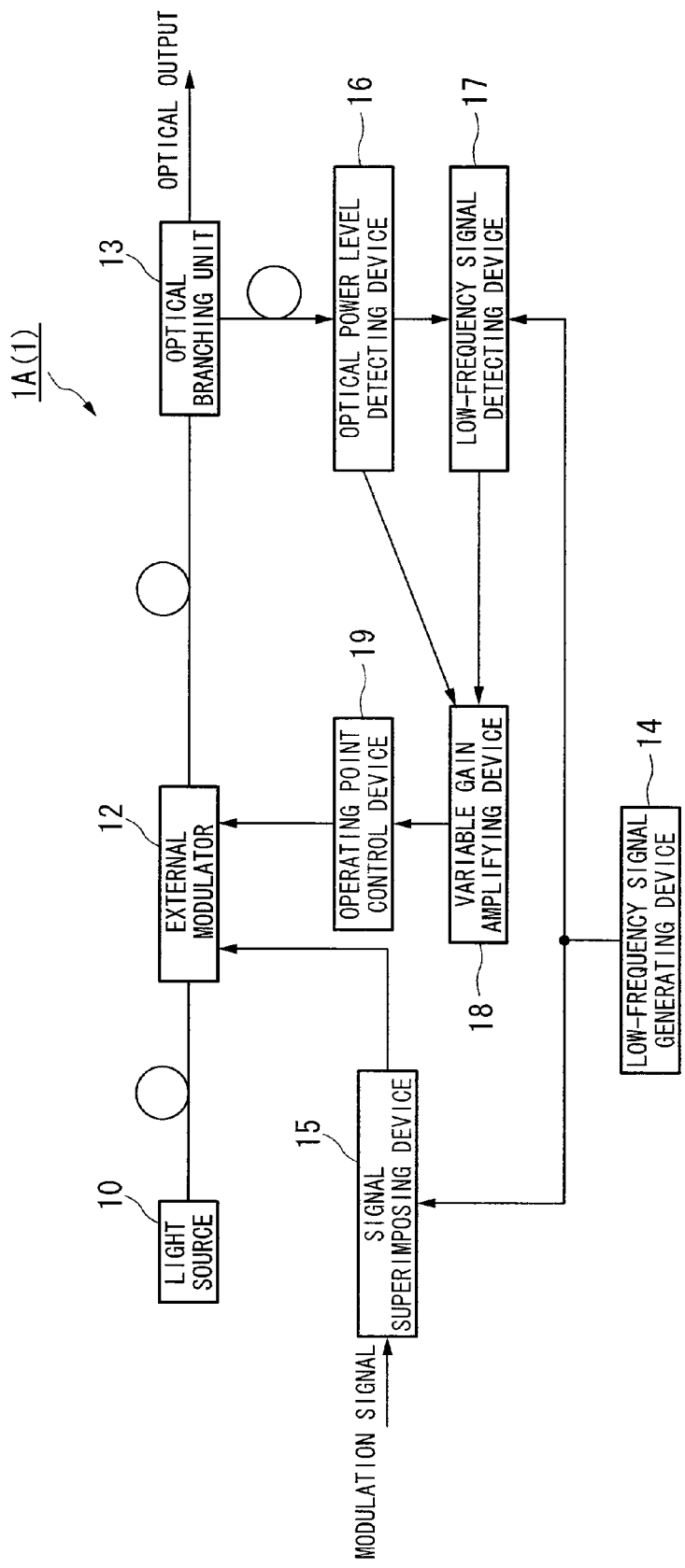
FIG. 1 is a block diagram showing a configuration of a control apparatus for an external modulator according to a first embodiment of the present invention.

1 (1A, 1B) Control apparatus for an external modulator
10 Light source
11 Optical output control device
12 External modulator (Mach-Zehnder type optical modulator)
13 Optical branching unit
14 Low-frequency signal generating device
15 Signal superimposing device
16 Optical power level detecting device
17 Low-frequency signal detecting device
18 Variable gain amplifying device
19 Operating point control device

BEST MODE FOR CARRYING OUT THE INVENTION

First Embodiment

Hereunder, embodiments of the present invention are described, with reference to the drawings. FIG. 1 shows a configuration of a control apparatus for an external modulator according to a first embodiment of the present invention. In FIG. 1, a control apparatus 1A (1) for an external modulator according to the first embodiment of the present invention is provided with: a light source 10; an optical branching unit 13; a low-frequency signal generating device 14; a signal superimposing device 15; an optical power level detecting device 16; a low-frequency signal detecting device 17; a variable gain amplifying device 18; and an operating point control device 19. This control apparatus 1A of an external modulator controls an external modulator 12 so as to modulate light emitted from the light source 10 based on input signals.

In the present invention, it is preferable that a Mach-Zehnder (MZ) type optical modulator 12 be used as the external modulator 12. To this Mach-Zehnder (MZ) type optical modulator 12 is input; an optical output from the light source 10, a modulation signal output from the signal superimposing device 15, and a bias voltage from the operating point control device 19. The Mach-Zehnder (MZ) type optical modulator 12, upon reception of this bias voltage, modulates the light input from the light source 10 according to the input of the modulation signal from the signal superimposing device 15, and then outputs this.

The low-frequency signal generating device 14 generates a low-frequency signal having a predetermined frequency f, and outputs this. Here, the predetermined frequency f refers to a frequency that does not overlap with a first modulation signal in the band, and that can be easily separated by a low-pass filter. The first modulation signal is usually in an approximate range of 10 kHz to 40 GHz, and therefore approximately 1 kHz is preferable as the frequency f for example. If the frequency f is too low, the control speed will drop, and also it will be difficult to separate it with a low-pass filter 17c described later.

As the low-frequency signal generating device 14, there may be applied a conventionally and widely known device such as a low-frequency oscillator, that is capable of generating the above predetermined frequency.

The signal superimposing device 15 superimposes on the original modulation signal (first modulation signal), which is the input signal of the Mach-Zehnder (MZ) type optical modulator 12, a low-frequency signal of the frequency f output from the low-frequency signal generating device 14, to thereby give a second modulation signal. The signal superimposing device 15 applies this second modulation signal as a new modulation signal, to the Mach-Zehnder (MZ) type optical modulator 12.

The signal superimposing device 15 is not particularly limited, and a device may be used such as variable gain amplifier, that is capable of amplitude-modulating the first modulation signal with a low-frequency signal of the frequency f, and outputting this as a second modulation signal. The second modulation signal output from the signal superimposing device 15 is input, via a driving amplifier and a capacitor for obtaining a predetermined signal level, to the Mach-Zehnder (MZ) type optical modulator 12. By means of this second modulation signal, the continuous light input from the light source 10 is modulated and output to the optical branching unit 13.

The optical branching unit 13 branches the light output from the Mach-Zehnder (MZ) type optical modulator 12 to an optical output unit (not shown in the figure) side and to the optical power level detecting device 16 side.

The optical power level detecting device 16 detects, among the optical outputs output from the Mach-Zehnder (MZ) type optical modulator 12, an average value of the optical outputs taken out by the optical branching unit 13. At this time, the average value of the optical outputs may be detected with use of diffused light (light leakage) of the Mach-Zehnder (MZ) type optical modulator 12.

Figure 2:
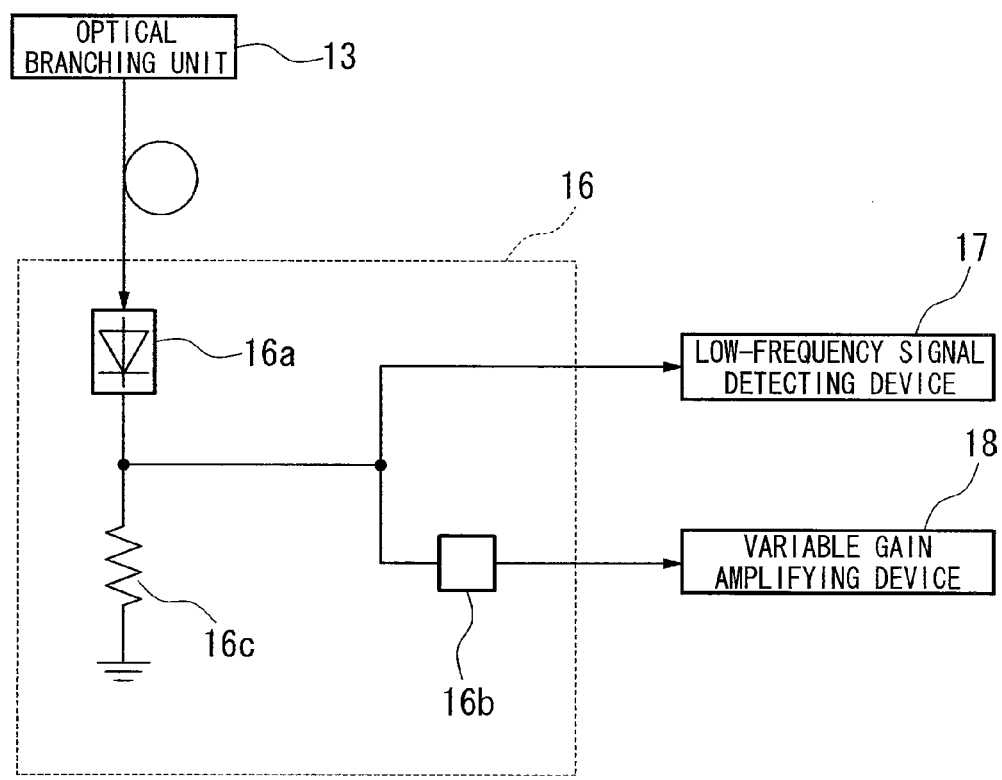
FIG. 2 is a diagram showing a configuration of an optical power level detecting device of the same embodiment.

The optical power level detecting device 16, as shown in FIG. 2 for example, is schematically configured with a photodiode 16a and a current detecting circuit 16b. The optical output of the Mach-Zehnder (MZ) type optical modulator 12 taken out by the optical branching unit 13 is converted, by the photodiode 16a, into an electrical signal (direct current component and modulation signal component), and the current detecting circuit 16b detects the magnitude of the direct current component (average value). Of the outputs of the optical power level detecting device 16, this direct current component is input to the variable gain amplifying device 18, and the modulation signal component is input to the low-frequency signal detecting device 17.

Figure 3:
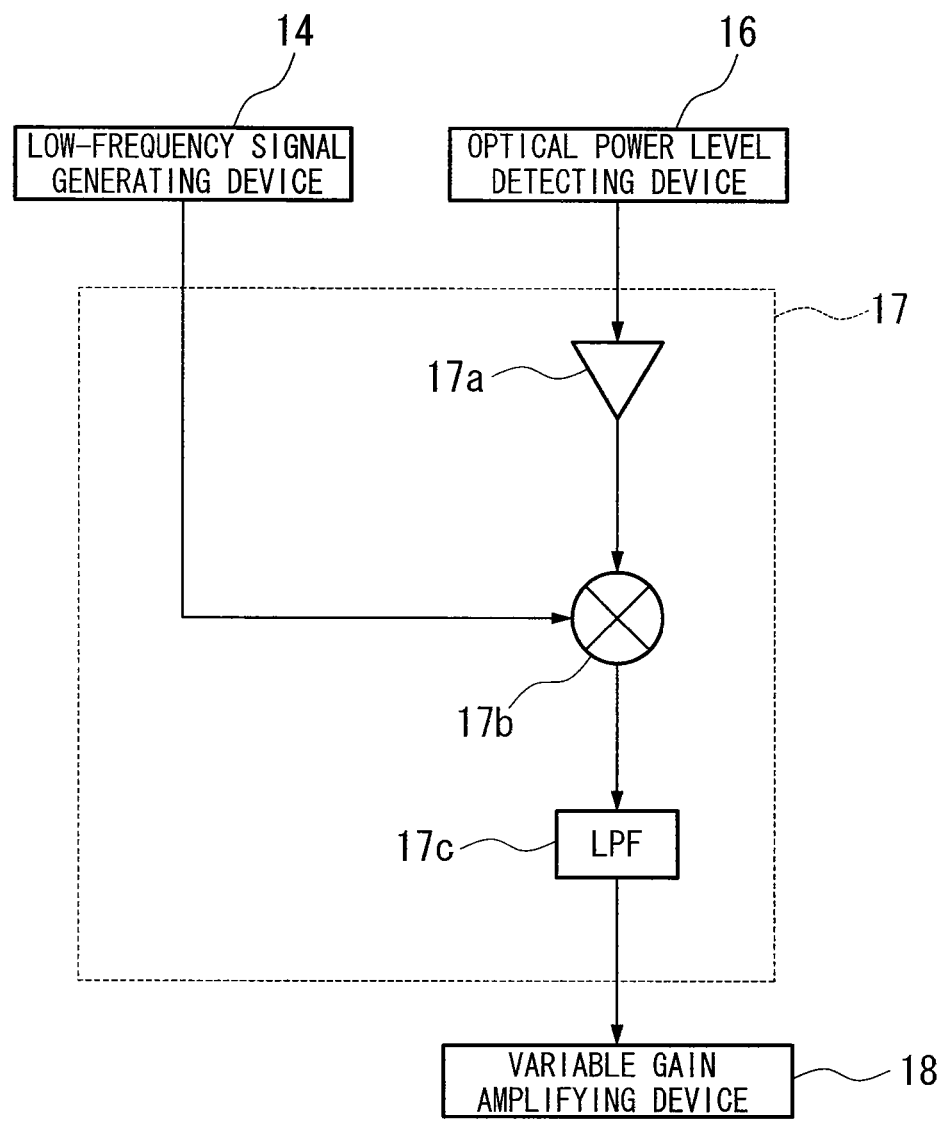
FIG. 3 is a diagram showing a configuration of a low-frequency signal detecting device of the same embodiment.

The low-frequency signal detecting device 17: detects a low-frequency signal component (frequency f) from the optical output of the Mach-Zehnder (MZ) type optical modulator 12, compares the phase of this detected low-frequency signal with the phase of the low-frequency signal output from the low-frequency signal generating device 14, detects phase difference information thereof (amount of operating point shift), and outputs this to the variable gain amplifying device 18. The low-frequency signal detecting device 16, as shown in FIG. 3 for example, is schematically configured with a band pass amplifier 17a, a mixer 17b, and the low-pass filter 17c. The electrical signal output from the optical power level detecting device 16 is input to one of the input terminals of the mixer 17b, via the band pass amplifier 17a that selectively amplifies low-frequency signals of the frequency f. To the other input terminal of the mixer 17b is input the low-frequency signal output from the low-frequency signal generating device 14. The mixer 17b compares the phase of these signals, and outputs a signal according to the phase difference, to the low-pass filter 17c. The low-pass filter 17c cuts off signals among the output from the mixer 17b, that have a frequency greater than a predetermined frequency (for example, a two-fold frequency component generated as a result of multiplication of the above signal, or a leakage component of the frequency f), and outputs a direct current voltage signal to the variable gain amplifying device 18. Since the low-pass filter 17c sufficiently cuts off these signals, the preferable band pass thereof is not more than 100 Hz.

Figure 4:
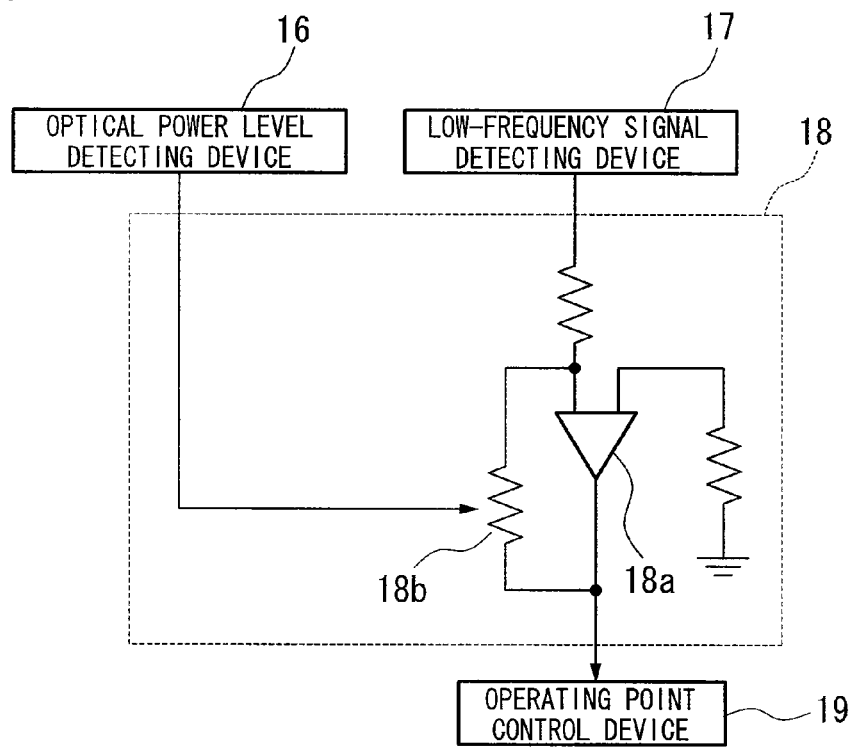
FIG. 4 is a diagram showing a configuration of a variable gain amplifying device of the same embodiment.

The variable gain amplifying device 18 amplifies the direct current voltage signal input from the low-frequency signal detecting device 17 according to the input from the optical power level detecting device 16, and outputs this to the operating point control device 19. This variable gain amplifying device 18, as shown in FIG. 4, is schematically configured with an amplifier 18a and a variable resistor 18b. By means of this configuration, the electrical signal input from the low-frequency signal detecting device 17 is set with a gain based on the detection output of the optical power level detecting device 16, is amplified by the amplifier 18a, and is output to the operating point control device 19.

Figure 5:
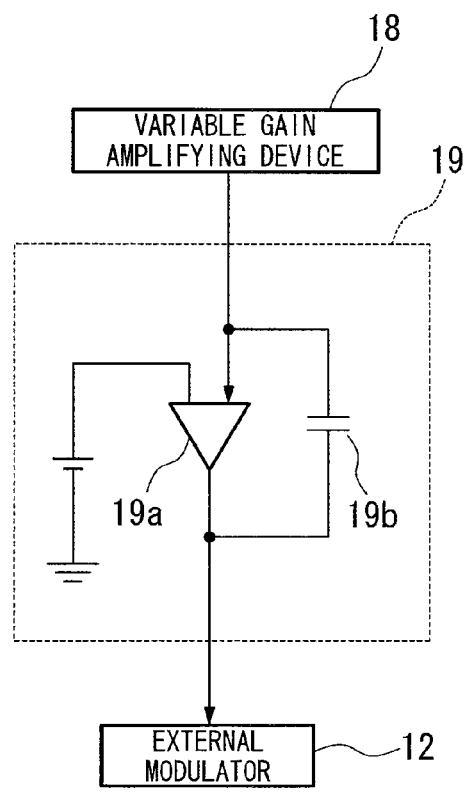
FIG. 5 is a diagram showing a configuration of an operating point control device of the same embodiment.

The operating point control device 19 controls based on the electrical signal output from the variable gain amplifying device 18, so as to compensate for the operating point drift of the Mach-Zehnder (MZ) type optical modulator 12. The operating point control device 17, as shown in FIG. 5, is schematically configured with an amplifier 19a and a capacitor 19b. This configuration gives an output that is dependant on the electrical signal output from the variable gain amplifying device 18 to compensate for the operating point drift of the Mach-Zehnder (MZ) type optical modulator 12. That is to say, the operating point control device 19 shifts the bias voltage according to the electrical signal output from the variable gain amplifying device 18, to compensate for the operating point drift of the Mach-Zehnder (MZ) type optical modulator 12.

Figure 11:
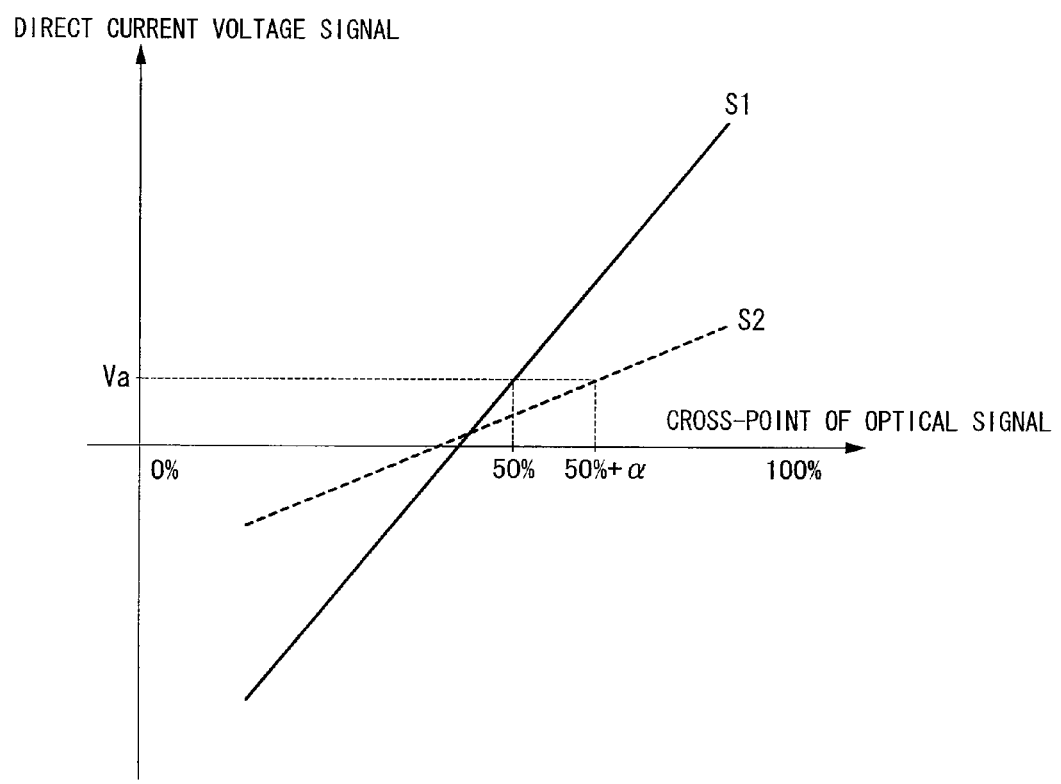
FIG. 11 is a graph showing a relationship between a direct current voltage signal and an optical signal cross-point.

In the control apparatus for an external modulator of the present embodiment, a gain according to the detection output of the optical power level detecting device 16 can be set by the variable gain amplifying device 18. By setting this gain in inverse proportion to the optical power level detected in the optical power level detecting device 16, it is possible to maintain constant the closed-loop gain of a loop from the output side of the Mach-Zehnder (MZ) type optical modulator 12 through the operating point control device 19 and back to the Mach-Zehnder (MZ) type optical modulator 12. Conventionally, in a case where an optical power input from the light source to the external modulator 12 changes due to temperature changes, the closed-loop gain changes and the optical signal cross-point changes. In the control apparatus for an external modulator of the present embodiment, as described above, even in a case where the optical power of the light source 10 changes, the closed-loop gain is constant. Therefore, even in the case where this optical power has changed, the relationship between a direct current voltage signal input to the operating point control device 19 and the optical signal cross-point does not change from the straight line S1 shown in FIG. 11. That is to say, even if the optical power of the light source 10 changes, the slope of the straight line shown in the graph of FIG. 11 will be constant. As a result, even if the optical power input from the light source 10 to the external modulator 12 changes, it is possible to suppress changes in the operating point of the Mach-Zehnder (MZ) type optical modulator 12.

Figure 9:
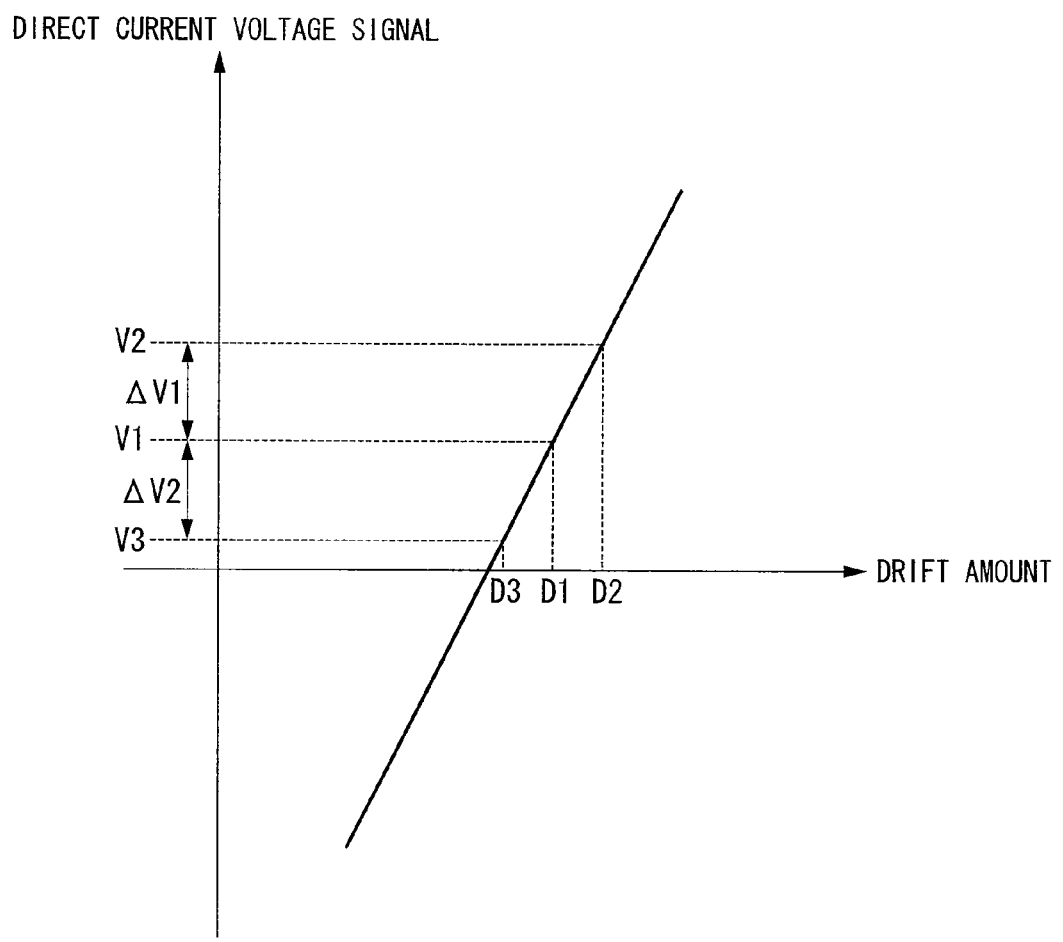
FIG. 9 is a graph showing a relationship between a direct current voltage signal and an amount of drift obtained in the control apparatus for an external modulator of the present invention.
Figure 10:
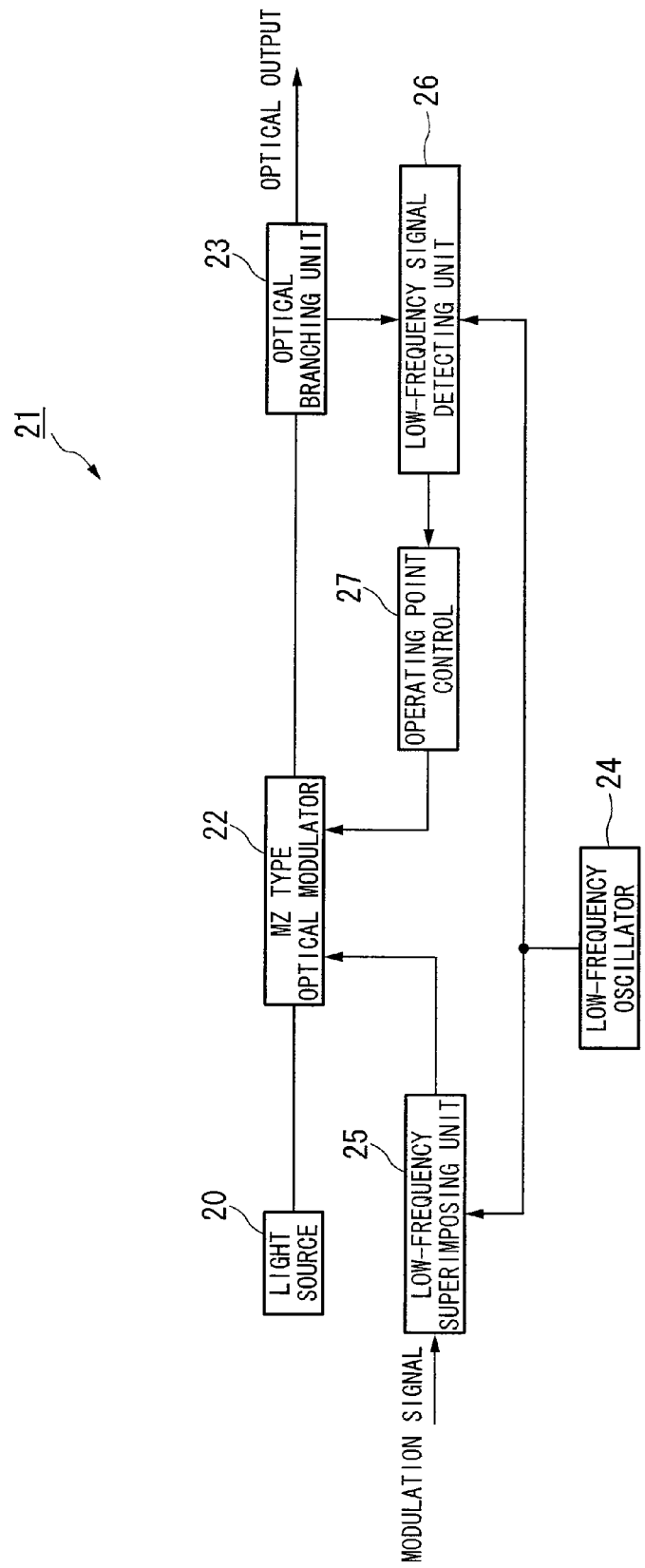
FIG. 10 is a block diagram showing a configuration of a conventional control apparatus for an external modulator.

FIG. 9 is a diagram showing a relationship obtained in the control apparatus for an external modulator of the present embodiment, between a direct current voltage signal input to the operating point control device 19 and an amount of drift. The vertical axis of the graph represents the magnitude of the direct current voltage signal, and the horizontal axis represents the amount of drift. V1 in the graph denotes the magnitude of a direct current voltage signal when an optimum optical output is being output from the external modulator 12 in the control apparatus for an external modulator of the present embodiment. Moreover, D1 in the graph denotes a state where an optimum optical output is being output from the external modulator 12 (initial value). In a case where an operating point drift (D2, D3) occurs due to temperature changes, or to a voltage applied to the Mach-Zehnder (MZ) type optical modulator 12, there is detected, according to this drift direction, a low-frequency component of the frequency f with the same phase or an inverted phase. The phase difference that occurs in this operating point drift is detected by the low-frequency signal detecting device 17, and it is thereby possible, with the operating point control device 19, to control the bias voltage so that the output of the direct current voltage signal becomes a constant value (V2, V3 become V1). Consequently, as with the conventional control apparatus for an external modulator, it is possible to compensate for the operating point drift that has occurred due to temperature changes, or to a voltage applied to the Mach-Zehnder (MZ) type optical modulator 12.

That is to say, the control apparatus for an external modulator of the present embodiment is capable of suppressing an operating point drift that occurs due to temperature changes or to a voltage applied to the Mach-Zehnder (MZ) type optical modulator 12, while being capable of suppressing an operating point shift that occurs due to changes in the optical power input to the Mach-Zehnder (MZ) type optical modulator 12. Therefore, compared to the conventional control apparatus for an external modulator, it is possible to more effectively suppress changes in the operating point of an external modulator, and to stabilize the output of the external modulator.

In the control apparatus 1A of an external modulator of the above first embodiment, the variable amplifying device 18 does not have to be present on the subsequent stage of the low-frequency signal detecting device 17, and only needs to be within the closed-loop. For example, the configuration may be such that the resistor 16c shown in FIG. 2 is a variable resistor, and this variable resistor 16c is provided with a function of the variable gain amplifying device 18. There still can be obtained an effect similar to that in the control apparatus 1A of an external modulator of the above first embodiment.

Next, is a description of a method of controlling the external modulator 12 with use of the control apparatus 1A of an external modulator of the present embodiment.

This method of controlling an external modulator includes: a first step for generating a low-frequency signal having a predetermined frequency by means of the low-frequency signal generating device 14; a second step for superimposing by means of the signal superimposing device 15, the low-frequency signal on a first modulation signal, which is the input signal, to make a second modulation signal, and applying this second modulation signal to the external modulator 12; a third step for detecting an average value of the optical output of the external modulator 12 by means of the optical power level detecting device 16; a fourth step for detecting by means the low-frequency signal detecting device 17, the low-frequency signal component from the optical output of the external modulator 12, comparing the phase of this detected low-frequency signal with the phase of the low-frequency signal output from the low-frequency signal generating device 14, and outputting a signal according the phase difference; a fifth step for setting the gain of the variable gain amplifying device 18 that amplifies the output of the low-frequency signal detecting device 17 and outputs this to the operating point control device 19, based on the detection output of the optical power level detecting device 16; and a sixth step for controlling, by means of the operating point control device 19, based on the signal according to the phase difference, so as to compensate for the operating point drift of the external modulator 12. Hereunder, the respective steps are described.

<First Step>

In the first step, a low-frequency signal having the above predetermined frequency f is generated by means of the low-frequency signal generating device 14.

<Second Step>

In the second step, the signal superimposing device 15 superimposes the low-frequency signal on the first modulation signal, which is the input signal, to thereby give the second modulation signal, and applies this second modulation signal to the external modulator 12. By means of this second modulation signal, an optical output of the signal that is input from the light source 10 to the Mach-Zehnder (MZ) type optical modulator 12 is modulated and output to the optical branching unit 13.

<Third Step>

In the third step, an average value of the optical output of the external modulator 12 is detected by the optical power level detecting device 16. Here a part of the light output from the Mach-Zehnder (MZ) type optical modulator 12 is taken out at the optical branching unit 13, is photoelectric converted by the photodiode 16a of the optical power level detecting device 16, and an average value thereof is detected in the current detecting circuit 16b.

<Fourth Step>

In the fourth step, the low-frequency signal detecting device 17 detects a low-frequency signal component (frequency f) in the optical output of the external modulator 12. The phase of this detected low-frequency signal component is compared with the phase of the low-frequency signal (generated in the first step) output from the low-frequency signal generating device 14, and a signal according to the phase difference (amount of the operating point shift) is detected. This is then converted into a direct current voltage signal, and output to the variable gain amplifying device 18.

<Fifth Step>

The gain of the variable gain amplifying device 18 that amplifies the output of the low-frequency signal detecting device 17 and that outputs it to the operating point control device 19, is set based on the signal output in the third step (detection output of the optical power level detecting device 16). At this time, the gain of the variable gain amplifying device 18 is set so that the closed-loop gain of a loop from the optical output side of the external modulator 12 through the operating point control device 19 and back to the external modulator 12, becomes constant.

<Sixth Step>

In the sixth step, the operating point control device 19 controls so as to compensate for the operating point drift of the external modulator 12. That is to say, upon reception of the output of the variable gain amplifying device 18, the operating point control device 19 shifts the bias voltage so as to follow the operating point drift of the Mach-Zehnder (MZ) type optical modulator 12, to thereby control the operating point of the Mach-Zehnder (MZ) type optical modulator 12.

Here is a description of the output of the optical power level detecting device 16, the gain of the variable gain amplifying device 18, and the closed-loop gain of a feedback loop for operating point control, with respect to the output of the Mach-Zehnder (MZ) type optical modulator 12.

Figure 6:
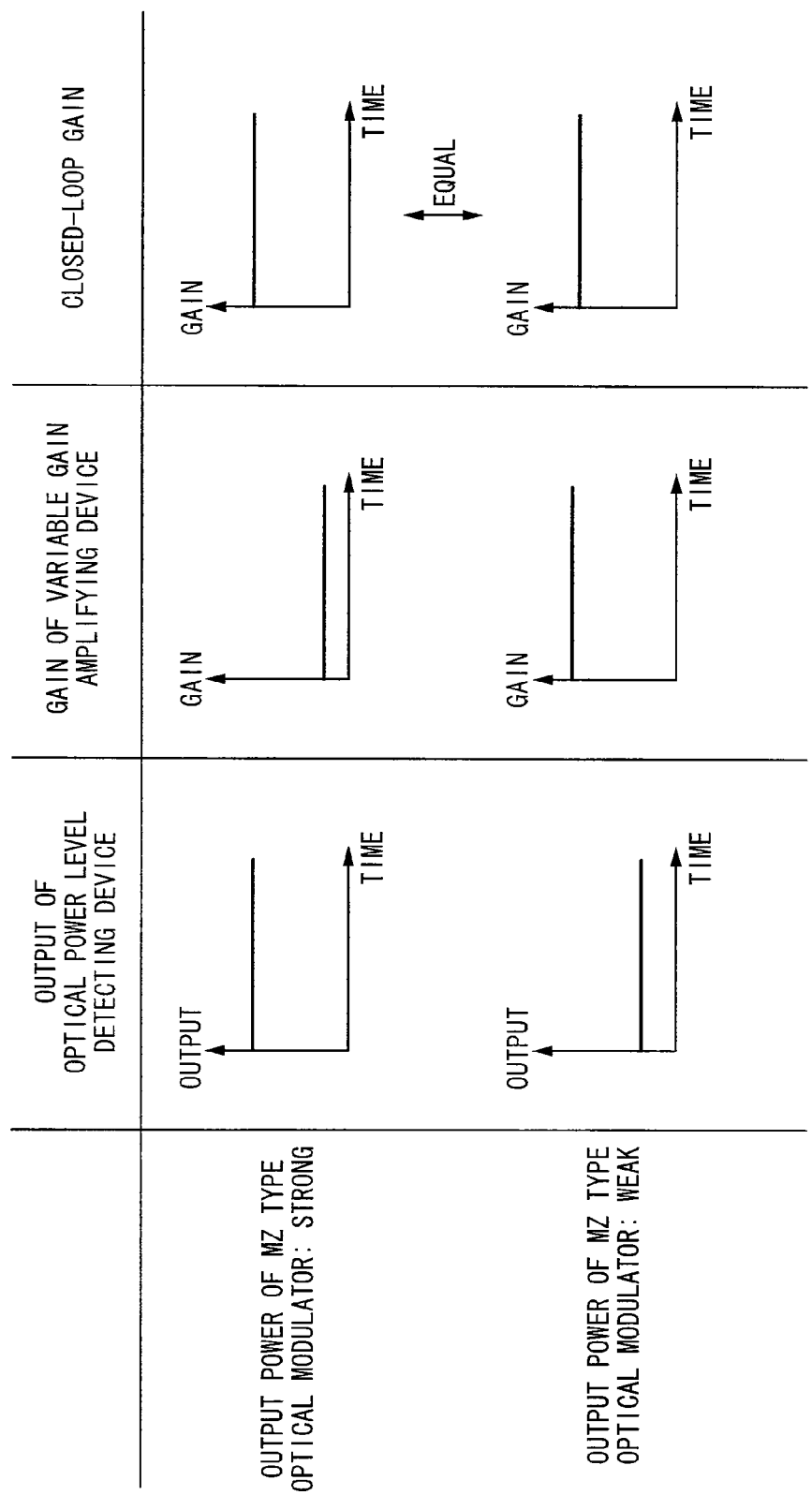
FIG. 6 is an explanatory diagram showing operations of the control apparatus for an external modulator according to the same embodiment.

FIG. 6 shows a relationship with respect to the output of the Mach-Zehnder (MZ) type optical modulator 12, of the output of the optical power level detecting device 16, the gain of the variable gain amplifying device 18, and the closed-loop gain of the loop from the output side of the Mach-Zehnder (MZ) type optical modulator 12 through the operating point control device 19 and back to the Mach-Zehnder (MZ) type optical modulator 12.

Considered here is a case where the optical output power of the Mach-Zehnder (MZ) type optical modulator 12 is strong (upper side in FIG. 6), and a case where the optical output power of the Mach-Zehnder (MZ) type optical modulator 12 is weak (lower side in FIG. 6). The output from the optical power level detecting device 16 to the variable gain amplifying device 18 is approximately proportional to the optical output power of the Mach-Zehnder (MZ) type optical modulator 12. Consequently, as shown in FIG. 6, the output of the optical power level detecting device 16 is greater in the case where the optical output power of the Mach-Zehnder (MZ) type optical modulator 12 is strong, compared to in the case where the optical output power thereof is weak.

The gain of the variable gain amplifying device 18, as has been described, is set so as to be inversely proportional to the detected value in the optical power level detecting device 16. Therefore, as shown in FIG. 6, as the optical output power of the Mach-Zehnder (MZ) type optical modulator 12 becomes stronger, the gain of the variable gain amplifying device 18 becomes smaller, and as the optical output power of the Mach-Zehnder (MZ) type optical modulator 12 becomes weaker, the gain of the variable gain amplifying device 18 becomes greater.

The closed-loop gain of the loop from the output side of the Mach-Zehnder (MZ) type optical modulator 12 through the operating point control device 19 and back to the Mach-Zehnder (MZ) type optical modulator 12, is proportional to the product of the output of the optical power level detecting device 16 and the gain of the variable gain amplifying device 18. In the present embodiment, the output of the optical power level detecting device 16 and the gain of the variable gain amplifying device 18 are inversely proportional. Therefore the product of these becomes substantially constant. Consequently, the closed-loop gain becomes substantially constant. Therefore it is possible, with the operating point control device 19, to control the operating point of the Mach-Zehnder (MZ) type optical modulator 12 so as to follow the operating point drift, and it is possible, as a result, to suppress changes in the operating point of the Mach-Zehnder (MZ) type optical modulator 12.

Second Embodiment

Figure 7:
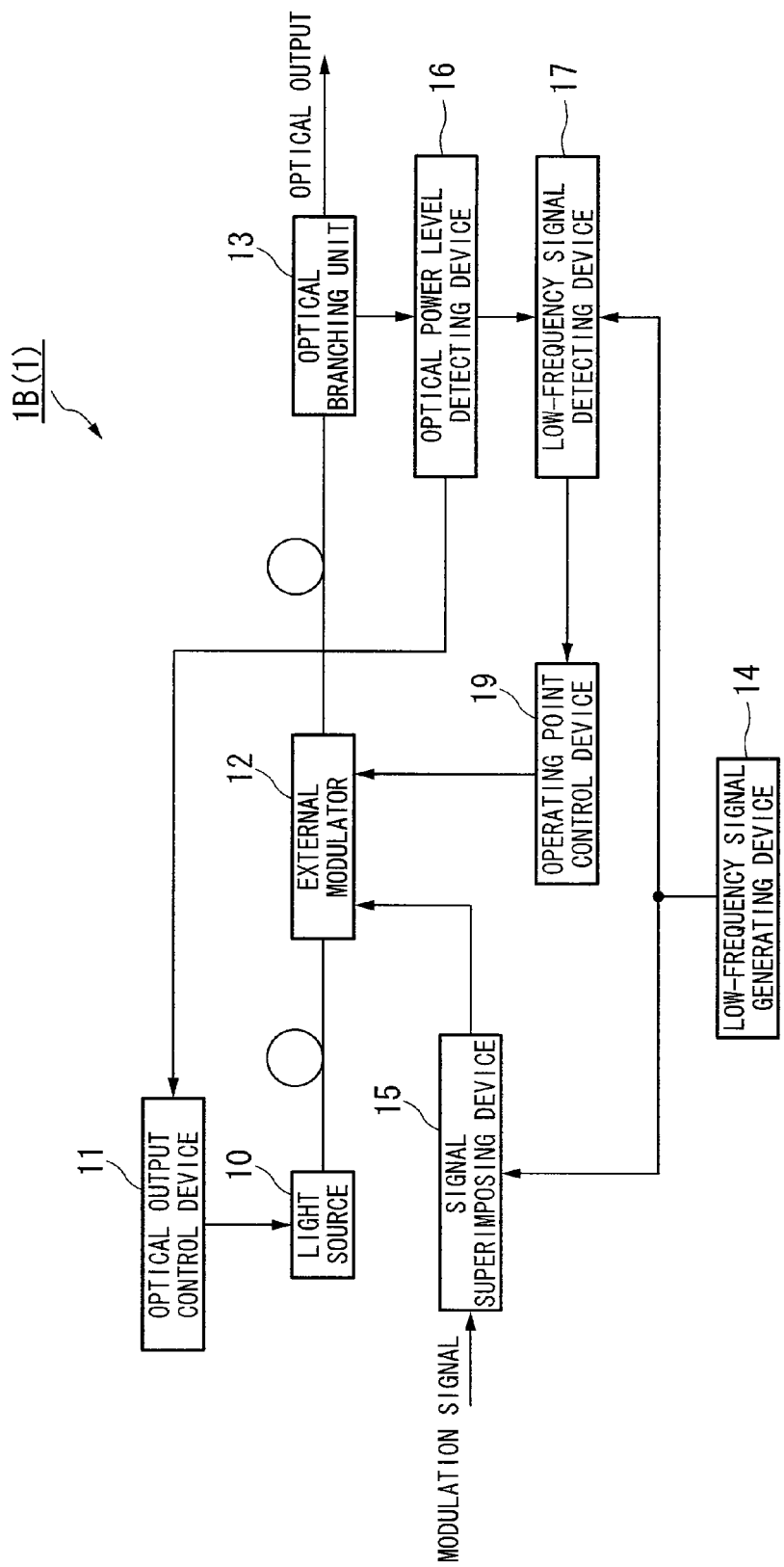
FIG. 7 is a block diagram showing a configuration of a control apparatus for an external modulator according to a second embodiment of the present invention.

Next a configuration of a control apparatus for an external modulator according to a second embodiment of the present invention, is shown in FIG. 7.

A control apparatus 1B (1) for an external modulator according to the present embodiment differs in configuration from the control apparatus 1A (1) for an external modulator according to the first embodiment in that instead of the variable gain amplifying device 18 in the first embodiment, there is provided an optical output control device 11 that controls the output of the light source 10. Components having a function similar to those of the first embodiment are denoted by the same reference symbols, and description thereof is omitted.

In FIG. 7, the control apparatus 1B of an external modulator according to the second embodiment of the present invention is provided with: a light source 10; an optical output control device 11; an optical branching unit 13; a low-frequency signal generating device 14; a signal superimposing device 15; an optical power level detecting device 16; a low-frequency signal detecting device 17; and an operating point control device 19. By means of this control apparatus 1B, light emitted from the light source 10 is modulated by the Mach-Zehnder (MZ) type optical modulator 12. In the present embodiment, this optical output of the light source 10 is controlled based on input signals from the optical power level detecting device 16.

In the present embodiment, the optical power level detecting device 16 detects an average value of the optical output of the Mach-Zehnder (MZ) type optical modulator that has been branched at the optical branching unit 13, and outputs this detected signal to the optical output control device 11. The optical output of the external modulator 12 taken out at the optical branching unit 13, as with the first embodiment, is converted by a photodiode 16a into an electrical signal (direct current component and modulation signal component), and a current detecting circuit 16b detects the magnitude of the direct current component (average value). Of the outputs of the optical power level detecting device 16, this direct current component is input to the optical output control device 11, and the modulation signal component is input to the low-frequency signal detecting device 17.

The operating point control device 19, based on a signal according to the phase difference (signal according to the operating point drift) output from the low-frequency signal detecting device 17, shifts the bias voltage, and thereby controls so as to compensate for the operating point drift of the Mach-Zehnder (MZ) type optical modulator 12.

Figure 8:
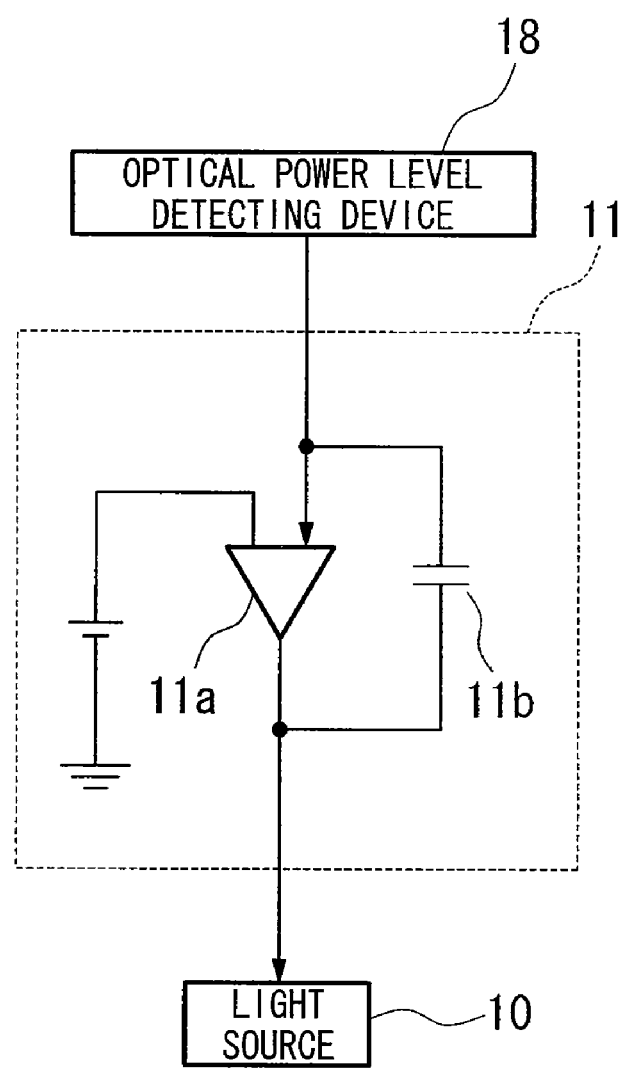
FIG. 8 is a diagram schematically showing a configuration of an optical output control device of the same embodiment.

The optical output control device 11, based on the detection output of the optical power level detecting device 16, controls the optical output of the light source 10 so that this detection output becomes constant. The optical output control device 11, as shown in FIG. 8, is schematically configured with an amplifier 11a and a capacitor 11b. By means of this configuration, output from the light source 10 is adjusted so that the electrical signal output from the optical power level detecting device 16 becomes constant.

As a result, even in a case where changes have occurred in the optical power input to the Mach-Zehnder type optical modulator 12 due to temperature changes, and insertion loss of the Mach-Zehnder type optical modulator 12 has increased, it is possible to suppress the operating point drift of the Mach-Zehnder type optical modulator 12 while reducing dependency of the operating point on changes in the input power of the Mach-Zehnder type optical modulator 12.

In the control apparatus 1B of an external modulator of the present embodiment, by means of the optical output control device 11, the optical output that is output from the Mach-Zehnder type optical modulator 12 can be made constant. Consequently, an operating point drift that occurs due to temperature changes or to a voltage applied to the Mach-Zehnder (MZ) type optical modulator 12 can be suppressed. Together with this, an operating point shift that occurs due to changes in the optical power input to the Mach-Zehnder (MZ) type optical modulator 12 can also be suppressed. Therefore, compared to the conventional control apparatus for an external modulator, it is possible to more effectively suppress changes in the operating point of an external modulator, and to stabilize the output of the external modulator.

Next, is a description of a method of controlling the external modulator 12 that modulates light emitted from the light source 10 based on input signals, with use of the control apparatus 1B of an external modulator of the present embodiment.

This method of controlling an external modulator includes: a first step for generating a low-frequency signal having a predetermined frequency by means of the low-frequency signal generating device 14; a second step for superimposing by means of the signal superimposing device 15, the low-frequency signal on a first modulation signal, which is the input signal, to make a second modulation signal, and applying this second modulation signal to the external modulator 12; a third step for detecting an average value of the optical output of the external modulator 12 by means of the optical power level detecting device 16; a fourth step for detecting by means of the low-frequency signal detecting device 17, the low-frequency signal component from the optical output of the external modulator 12, comparing the phase of this detected low-frequency signal with the phase of the low-frequency signal output from the low-frequency signal generating device 14, and outputting a signal according the phase difference; a fifth step for controlling by means of the operating point control device 19, based on the signal according to the phase difference, so as to compensate for operating point drift of the external modulator 12; and a sixth step for controlling the optical output of the light source 10 by means of the optical output control device 11, based on the detection output of the third step, so that the detected value of the optical power level detecting device 16 becomes constant. Regarding the first step to the fourth step, the control method is similar to that in the first embodiment.

<Fifth Step>

In the fifth step, based on the signal according to the phase difference detected in the fourth step (signal according to the operating point drift), the operating point control device 19 controls so as to compensate for the operating point drift of the external modulator 12. That is to say, upon reception of the output of the low-frequency signal detecting device 17, the operating point control device 19 controls the operating point of the Mach-Zehnder (MZ) type optical modulator 12 so as to follow the operating point drift of the Mach-Zehnder (MZ) type optical modulator 12.

<Sixth Step>

In the sixth step, based on the detection output of the third step, the optical output control device 11 controls the optical output of the light source 10 so that a detected value of the optical power level detecting device 16 becomes constant.

As a result, even if changes have occurred in the optical power input to the Mach-Zehnder type optical modulator 12, due to temperature changes, it is possible to suppress operating point drift of the Mach-Zehnder type optical modulator 12 while reducing dependency of the operating point on changes in the input power of the Mach-Zehnder type optical modulator 12.

INDUSTRIAL APPLICABILITY

In the control apparatus for an external modulator of the present invention, gain of the variable gain amplifying device is set so that the closed-loop gain in the loop from the output side of the external modulator through the operating point control device and back to the external modulator, becomes constant. As a result, changes in the operating point of the external modulator can be suppressed, while reducing dependency of the operating point on changes in the input power of the external modulator.

The invention claimed is:

1. A control apparatus for an external modulator that modulates light emitted from a light source based on an input signal, the control apparatus comprising:
   a low-frequency signal generating device that generates and outputs a low-frequency signal having a predetermined frequency;
   a signal superimposing device that superimposes a first modulation signal, which is the input signal on the low-frequency signal, to make a second modulation signal, and applies this second modulation signal to the external modulator;
   a low-frequency signal detecting device that detects the low-frequency signal component from an optical output of the external modulator, compares a phase of this detected low-frequency signal with a phase of a low-frequency signal output from the low-frequency signal generating device, and outputs a signal according to a phase difference;
   an operating point control device that controls based on an output signal of the low-frequency signal detecting device, so as to compensate for operating point drift of the external modulator;

an optical power level detecting device that detects an average value of an optical output of the external modulator; and a variable gain amplifying device configured so as to set a gain based on a detection output of the optical power level detecting device, that amplifies an output of the low-frequency signal detecting device, and outputs this to the operating point control device, wherein gain of the variable gain amplifying device is set so that a closed-loop gain of a loop from an output side of the external modulator through the operating point control device and back to the external modulator, becomes constant.

2. A control apparatus for an external modulator that modulates light emitted from a light source based on an input signal, the control apparatus comprising:

a low-frequency signal generating device that generates and outputs a low-frequency signal having a predetermined frequency;

a signal superimposing device that superimposes a first modulation signal, which is the input signal on the low-frequency signal, to make a second modulation signal, and applies this second modulation signal to the external modulator;

a low-frequency signal detecting device that detects a low-frequency signal component of the frequency of the low-frequency signal from an optical output of the external modulator, compares a phase of the low-frequency signal component detected from the optical output with a phase of a low-frequency signal output from the low-frequency signal generating device, and outputs a phase difference thereof as an output signal, the output signal signifying the amount of operating point shift in the optical output;

an operating point control device that controls an operating point of the external modulator so as to follow an operating point drift of the external modulator based on the output signal of the low-frequency signal detecting device;

an optical power level detecting device that detects an average value of an optical output of the external modulator; and an optical output control device that controls the light emitted from the light source so that the average value detected by the optical power level detecting device becomes constant.

3. A control method of an external modulator that modulates light emitted from a light source based on an input signal, the control method including:

a first step for generating a low-frequency signal having a predetermined frequency by means of a low-frequency signal generating device;

a second step for superimposing by means of a signal superimposing device, the low-frequency signal generated in the first step on a first modulation signal, which is the input signal, to make a second modulation signal, and applying this second modulation signal to the external modulator;

a third step for detecting an average value of an optical output of the external modulator by means of an optical power level detecting device;

a fourth step for detecting by means of a low-frequency signal detecting device, the low-frequency signal component from an optical output of the external modulator, comparing a phase of this detected low-frequency signal with a phase of a low-frequency signal output from the low-frequency signal generating device, and outputting a signal according to a phase difference;

a fifth step for setting a gain of a variable gain amplifying device that amplifies an output of the low-frequency signal detecting device and outputs this to the operating point control device, based on a detection output of the optical power level detecting device; and a sixth step for controlling, by means of an operating point control device, based on a signal according to the phase difference, so as to compensate for operating point drift of the external modulator, wherein in the fifth step, gain of the variable gain amplifying device is set based on a signal output in the third step, so that a closed-loop gain of a loop from an optical output side of the external modulator through the operating point control device and back to the external modulator, becomes constant.

4. A control method of an external modulator that modulates light emitted from a light source based on an input signal, the control method including:

a first step for generating a low-frequency signal having a predetermined frequency by means of a low-frequency signal generating device;

a second step for superimposing by means of a signal superimposing device, the low-frequency signal on a first modulation signal, which is the input signal, to make a second modulation signal, and applying this second modulation signal to the external modulator;

a third step for detecting an average value of an optical output of the external modulator by means of an optical power level detecting device;

a fourth step for detecting by means of a low-frequency signal detecting device, a low-frequency signal component of the frequency of the low-frequency signal from an optical output of the external modulator, comparing a phase of the low-frequency signal component detected from the optical output with a phase of a low-frequency signal output from the low-frequency signal generating device, and outputting a phase difference thereof as an output signal, the output signal signifying the amount of operating point shift in the optical output;

a fifth step for controlling by means of an operating point control device, an operating point of the external modulator so as to follow an operating point drift of the external modulator based on the output signal; and a sixth step for controlling the light emitted from the light source by means of an optical output control device so that the average value detected by the third step becomes constant.

* * * * *